Jan. 4, 1944.  G. FRIES  2,338,421
APPARATUS FOR UNWINDING AND WINDING UP ENDLESS FILMS
Filed Feb. 2, 1940  3 Sheets-Sheet 1
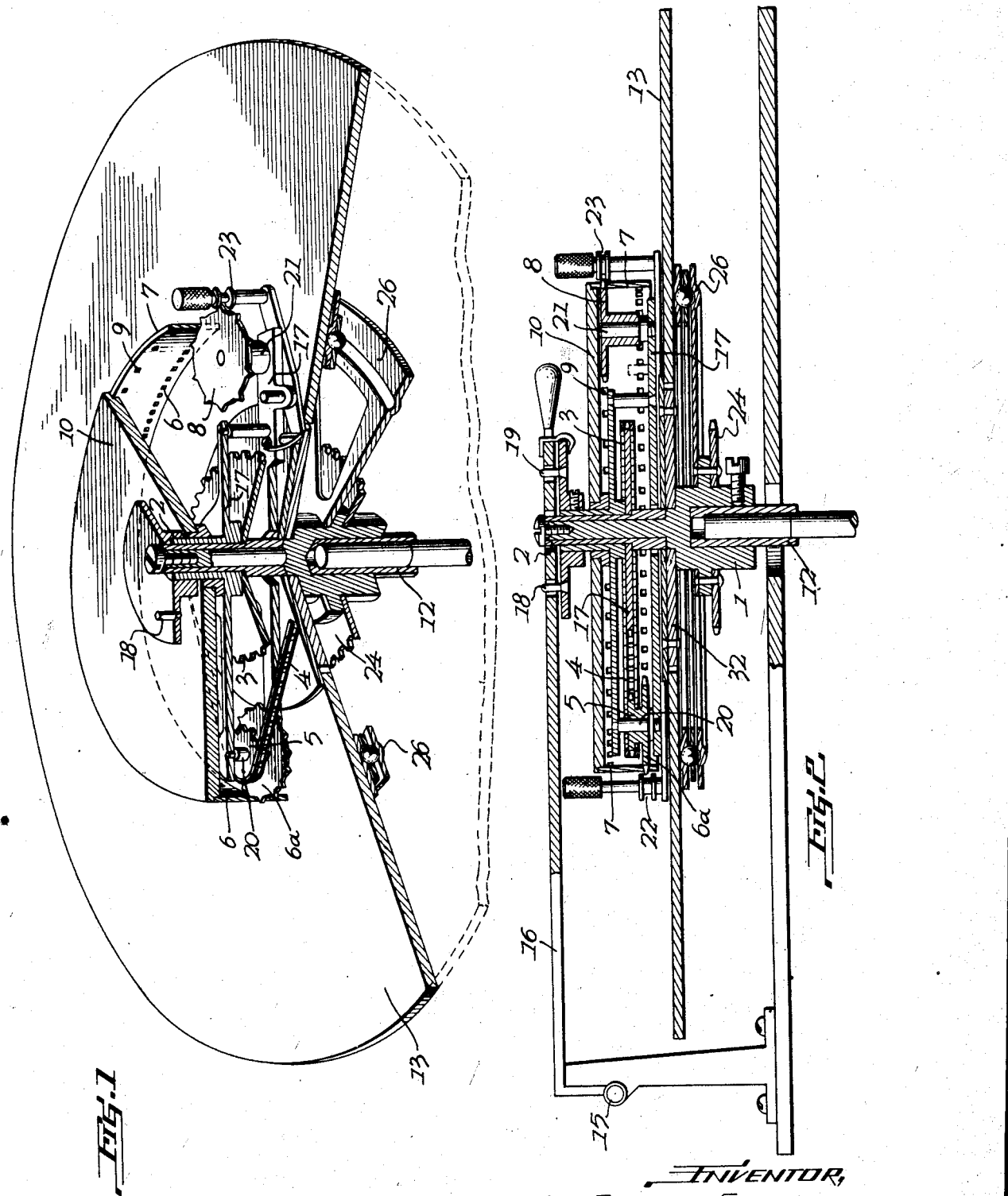
INVENTOR,
GUSTAV FRIES.
by Allttolcombe
ATTY.

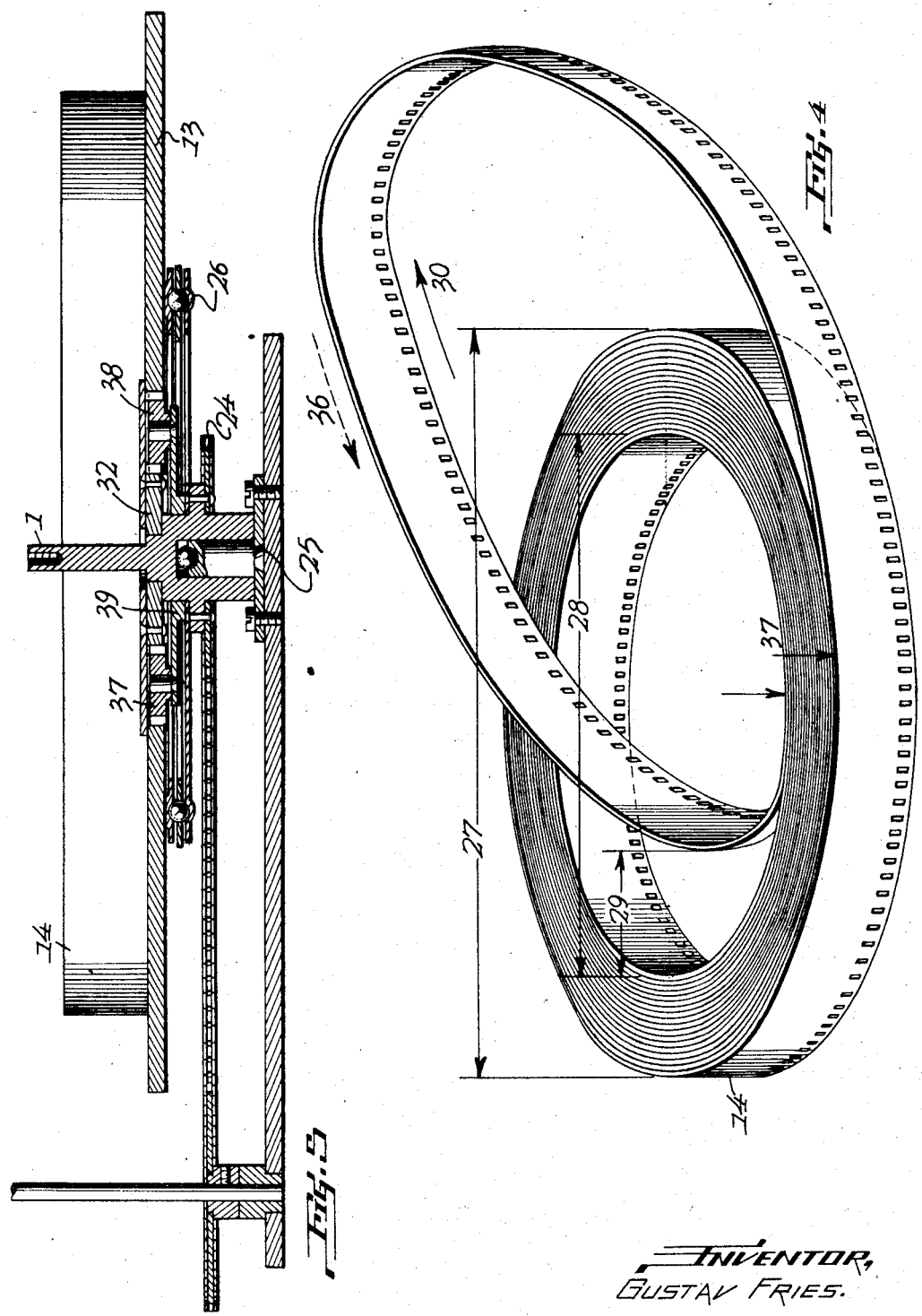

Jan. 4, 1944.  G. FRIES  2,338,421
APPARATUS FOR UNWINDING AND WINDING UP ENDLESS FILMS
Filed Feb. 2, 1940  3 Sheets-Sheet 3
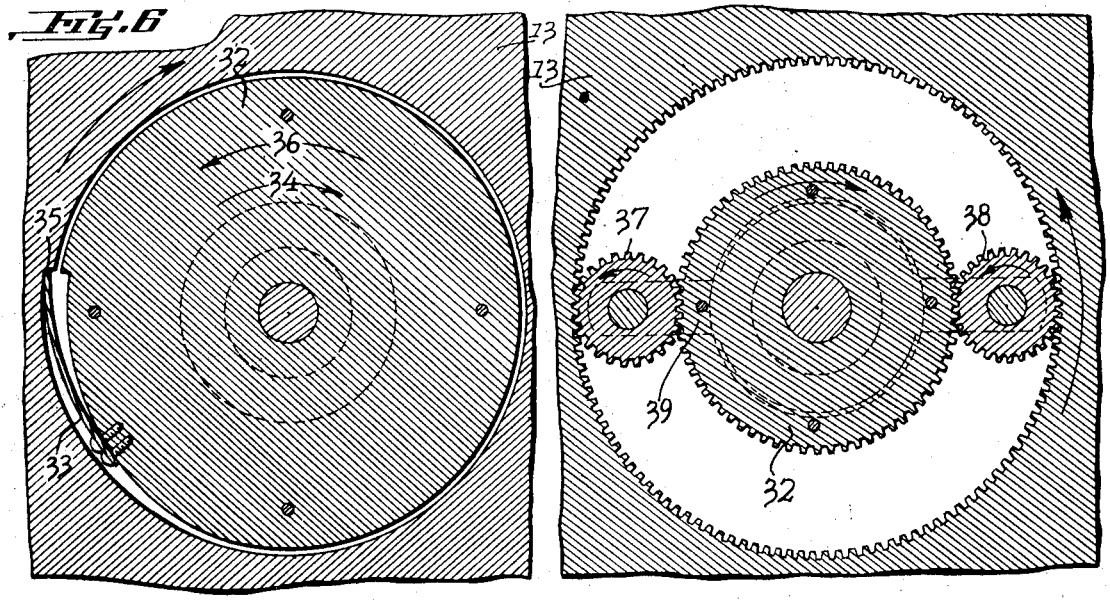
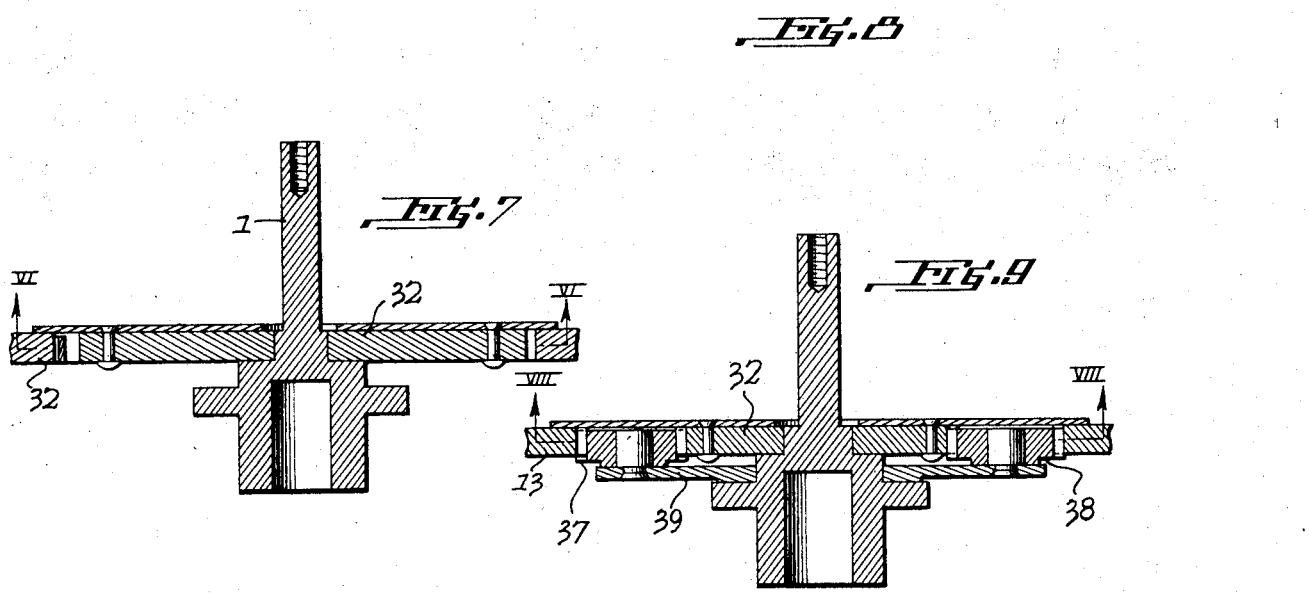
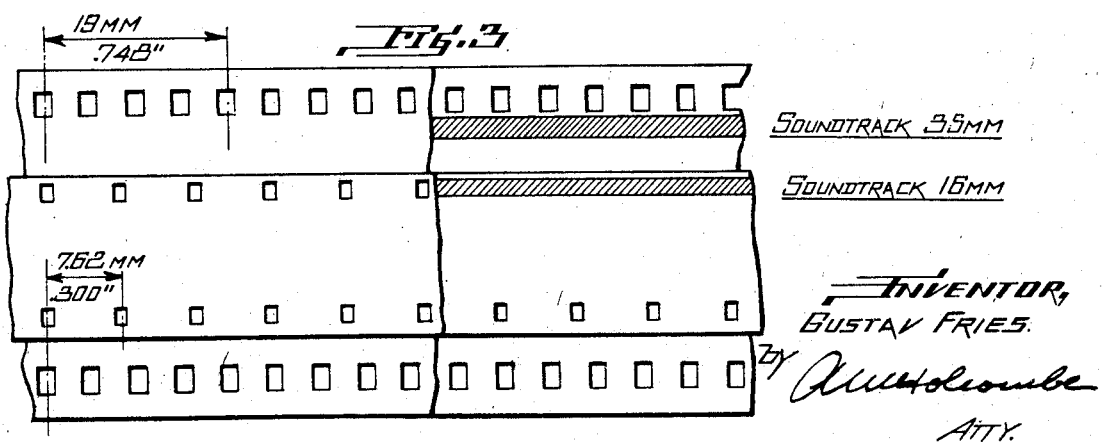
INVENTOR,
GUSTAV FRIES.
BY
ATTY.

Patented Jan. 4, 1944

2,338,421

UNITED STATES PATENT OFFICE 2,338,421

APPARATUS FOR UNWINDING AND WINDING UP ENDLESS FILMS

Gustav Fries, Berlin-Charlottenburg, Germany; vested in the Alien Property Custodian Application February 2, 1940, Serial No. 316,983
In Germany June 22, 1939

9 Claims. (Cl. 88—18.7)

The present invention relates to a device for winding a film band, more particularly an endless film band adapted to be run in forward or reverse direction.

Characteristic of the invention is the feature that the winding is effected from and onto a coil of film by means of a core member provided in the center of the coil, the outwardly or inwardly running film loop being guided by an auxiliary roller.

In the motion picture art it is usual, if there are to be performed repeated representations of the same film, for example for advertising purposes, to splice the ends of the film together to form an endless band which is wound on and unwound from special devices. The winding from the interior to the exterior of a film coil is not accompanied by particular difficulties up to certain film lengths. There are also in use devices which permit winding from the exterior inwardly. As far as I am aware, however, the known devices are not operable in the reverse direction without difficulties.

It is therefore an object of this invention to provide a film winding device operable in forward and reverse direction, at will. More particularly the invention aims at providing a device running equally smoothly in both directions, thereby lending itself to the reproduction of sound film, where variations in running speed will cause unpleasant distortion of the sound. In the moving picture art there are employed two international standards of spacing of the perforations, one for normal (35 millimeter) films and one for narrow (16 millimeter) films. Narrow sound film bearing a sound track has a perforation along one edge only. For special purposes it is desirable to use normal and narrow film bands interchangeably with the same apparatus. Devices with which endless film bands can be wound have heretofore not been available. At the same time it is also desirable that the device permit winding of the film band in reverse direction, for example in an educational film, in order to repeat an interesting scene before the entire film is run off. Similarly it is a valuable feature of a dictating machine operating with a band record to permit reversal of the direction of the band in order to be able to repeat a previous sentence.

It is accordingly a further aim and feature of this invention to provide a film winding device operable in forward and reverse direction and adapted for use with normal as well as narrow film of both the silent and the sound type.

According to the invention the winding of the film is accomplished by driving the film coil as well as a core structure in the center of the film coil for feeding the film by means of a toothed wheel. The film coil may be arranged in a horizontal position, a turntable serving as a support for the coil. In this arrangement the speed of rotation of the turntable may automatically be matched to the rate at which the film resting upon the same is fed. If the film is wound from the interior onto the exterior of the coil, the turntable is positively driven. For this purpose the turntable may have a circular concentric aperture in which a driving member is arranged rotating the turntable in the desired direction by means of a spring engaging a recess in the aperture of the turntable. If, however, the film is wound in the opposite direction, the film supporting turntable either runs free or may slightly be braked or, as tests have shown, may even be arrested because the friction on the supporting surface is very small.

In a film winding device for films exceeding about 100 meters in length a planetary gear drive may advantageously be employed between the turntable and its driving shaft which, in dependence on the friction of the film coil will drive the turntable in a compensating manner.

It is a further object of the invention to provide a film winding device which may be operated in a vertical, horizontal, or any intermediate position. In the first mentioned case the film preferably rests upon the core member while in the second case the turntable serves as a support.

It is a further purpose of this invention to provide a film winding device of convenient and practical size including a core for feeding the film, the core being so dimensioned as to permit engagement by sprocket wheels having sprockets for narrow as well as normal film.

It is a further object of the invention to provide a film winding device actuable by attachment to a conventional phonograph motor in which a driving shaft rotates at the standardized rate of 78 R. P. M.

The invention also aims at providing a film winding device of rugged but small construction so as to fit within a fireproof drum used for combustible normal film.

These and further aims, objects and advantages of the invention will appear from a consideration of the description and the accompanying drawings showing for purely illustrative purposes embodiments of this invention. It is to be understood, however, that the invention is not to be taken in a limiting sense, the scope of the invention being defined in the appended claims.

In the drawings:

Fig. 1 is a perspective view, partly in section, of a form of film winding device according to this invention;

Fig. 2 is a vertical cross-section through the device shown in Fig. 1;

Fig. 3 illustrates the relation between the perforations of normal and narrow films of the silent as well as sound type;

Fig. 4 is a perspective view of a film coil and loop to be wound on the device of Figs. 1 and 2;

Fig. 5 shows in part a modified form of drive for the device of Figs. 1 and 2;

Figs. 6 and 7 are a plan and an elevational view, respectively, of an element of Figs. 1 and 2; and Figs. 8 and 9 are a plan and an elevational view, respectively, of an element of Fig. 5.

In order to permit winding of film bands having differently spaced perforations the sprocket wheel 5, driven from the axis of a driving shaft 1, 2 by means of a gear 3 and a chain 4, is provided with teeth spaced 4.74 millimeters apart. The sprocket wheel 5 engages perforations 6 of the peripheral wall 7 of a core 10 and drives the latter, whereby, in turn, a second sprocket wheel 8 having teeth spaced 7.62 millimeters apart is driven by engagement with perforations 9 in the peripheral wall of the core. The diameter of the core 10 is so chosen that its circumference is a whole multiple of the spacing of the perforations of both normal and narrow film. The diameter of the core is preferably between 100 and 150 millimeters so that the size of a turntable 13 associated with the core is kept within practicable limits. For the feeding of normal film 80 perforations are provided in the periphery of the core resulting in a diameter of the core of $$\frac{\text{number of perforations} \times \text{spacing}}{3.14} =$$

$$\frac{80 \times 4.75}{3.14} = 121.0 \text{ millimeters}$$

For narrow film fifty perforations are provided resulting in a diameter of $$\frac{50 \times 7.62}{3.14} = 121.3 \text{ millimeters}$$

The difference of .3 millimeter is of no practical importance and does not have any detrimental effect.

If the device is to be universal in its use the standards of running speed of films must be taken into account. As the speed of sound film is fixed at 45.6 centimeters per second, the circumferential speed of the core 10 must correspond to this figure. The diameter of the core being 121 millimeters and the circumferential length being about 380 millimeters the core 10 must make 1.2 revolutions per second or 72 revolutions per minute.

The sprocket wheel 6a has 16 teeth and thus a circumference of 16×4.75=76 millimeters or a diameter of 24.2 millimeters. The ten-toothed sprocket wheel 8 has a circumferential length of 10×7.62=76.2 millimeters or a diameter of 24.2 millimeters. The sprocket wheels 6a and 8 engage the core 10 making 72 R. P. M. according to a film speed of 45.6 centimeters per second and thus perform 80÷16=5 and 50÷10=5 revolutions respectively per rotation of the core and 5×72=360 revolutions per minute. The sprocket wheels are driven by chain gears 3, 5 and a chain 4, the two chain gears having a ratio of 1 to 4.6.

A gear 5 having 10 teeth and a gear 3 having 46 teeth are small enough to be conveniently arranged in interior space of the core. With this gear ratio the driving shaft 1, 2 performs 78 revolutions per minute corresponding to the normal number of revolutions of the turntable of a phonograph.

It will be seen what capabilities of use result from the construction of a film winding device, according to the invention, to the moving pictures and sound recording art. These numerous capabilities of use, are rendered possible by reason that the existing international standards of film perforations have been taken into account and that also useful dimensions of the several parts have been found bringing standards of size and speed used in the moving picture art into an advantageous relationship with corresponding standards in the sound recording art. It is possible to use the film winding device without alteration of parts in widely different assemblies with known devices, as will appear from the following examples:

(1) As shown in Figs. 1 and 2 the device may be mounted on a normal phonograph spindle serving as a driving element by inserting an intermediate member 12 having a conical bore. The film winding apparatus is thus placed upon the phonograph motor spindle in place of the usual record turntable. In this arrangement the holding bracket 16 permitting an exchange of the film coil 14 (Fig. 4) the turntable 13 (Fig. 5) is pivoted at 15, holding the bridge 17 by means of pins 18 and 19. The sprocket wheels 6a and 8 are rotatably mounted on pivots 20, 21 provided on this bridge. Auxiliary rollers 22, 23 are provided on the bridge 17 for maintaining the film in engagement with the sprocket wheels. By means of a chain or in any other suitable manner a gear 24 may drive a drum (not shown) for guiding the film past a reproducing or projection device for reproducing the picture and/or sound from the record.

(2) The film winding apparatus may also be rotatably mounted on a pin 25 of a projector with omission of the intermediate member 12. The apparatus receives its drive from a projector shaft making 180 or 360 revolutions per minute respectively in connection with a reduction gear of a ratio of 2.3 to 1 or 4.6 to 1 for normal film. For use with narrow film the device is driven in a similar manner to feed the film at the standardized rate of 183 millimeters per second.

(3) The drive may also be effected by means of a driver mounted above the film winding device to engage the shaft 1 (Fig. 7). It is thus possible to arrange the film winding device interchangeably beneath the apparatus with which it is used.

It is obviously also possible for special purposes to construct the sprocket wheel 6a as a smooth roller for use with imperforate film. In this case the sprocket wheel 8 and the auxiliary roller 23 may be omitted.

As may be seen from Figs. 1, 2 and 5 the film supporting turntable 13 is mounted on a ball bearing 26 to be rotatable independently from the shaft 1, 2 and the core member 7, 10.

In this case the film coil 14 must, corresponding to its larger outer diameter 27 (Fig. 4), adjust itself with respect to the smaller internal diameter 28, the speed of unwinding and winding being equal. If for instance the length of the film coil is 100 meters and if the internal diameter 28 is 140 millimeters corresponding to a required space 29 for the auxiliary rollers 22, 23, then the film coil consists of about 200 turns and would have a film thickness of .3 millimeter have an outer diameter 27 of about 300 millimeters. The circumference at the outer diameter 27 then is 942 millimeters and that at the internal diameter 28 is about 565 millimeters. The circumference at the outer diameter 27 is about 387 millimeters longer than the circumference at the internal diameter 28. This difference in length must be compensated for in winding the endless film band.

If the winding of the film is effected in the direction of the arrow 30, i. e., from the interior outwards, then the point 31 of the film will reach the inner circumference 28 after about 200 revolutions of the film coil 14. There is thus for each revolution of the film coil a displacement of the turns relatively to one another of about 387 millimeters difference in length÷200=about 1.9 millimeters. As the central shaft 1, 2 makes 1.3 revolutions per second and the film coil 14 rotates at the same number of revolutions the displacement of the film turns relatively to one another is at the rate of 1.9 millimeters×1.3=2.47 millimeters per second. The slip of the film turns relatively to one another, therefore, is thus very small; however this value is to be regarded only as an average value, because at the outer periphery of the film coil the slip is largest and decreases gradually towards the inner periphery where it becomes zero at the innermost turn.

For winding the film from the interior outwards the plate 13 carrying the coil 14 may be rigidly connected to the core axis, 1, 2; in this case the greater circumferential speed of the outer periphery of the coil effects steady compensation by reason of the tension or pull exerted on the outermost turn tending to decrease the external diameter of the coil. It is to be noted that the supporting surface of the turntable must be as hard and smooth as possible in order that the friction of the film edge thereon may not be great.

The device shown in Figs. 6 and 7 may be used for driving the turntable 13 from the central shaft 1, 2. In the illustrated device a disc 32 having a spring 33 is fixedly mounted to the central shaft 1. In the direction of rotation indicated by an arrow 34 the spring 33 rotates the turntable 13 by resting against a recess 35.

The case is different when the film is wound from the exterior inwardly as shown by the arrow 36. The turntable is free in this case and rotates with the speed at which the film loop is drawn off at the outer periphery. The film band in this case is positively fed to the inner periphery by the sprocket wheels 6a and 8.

For films of greater length than 100 meters it is advantageous to use in lieu of the device shown in Figs. 6 and 7 a device such as is shown in Figs. 8 and 9. In this device planetary rollers 37, 38 with their carrier 39 are rotatably mounted about the shaft 1 and engage a disc 32 and the film turntable 13 respectively. Compensation between the rotation of the film coil and that of the turntable is automatically accomplished in this case by the friction of the film coil 14 resting upon the turntable 13 (Fig. 5). The total friction is reduced by drive from the shaft axis 1 by way of the disc 32 and the planetary gears 37 and 38.

The total friction may further be reduced by utilizing the slight tension on the film band occurring during winding and unwinding for braking or releasing the carrier 39 which results in accelerating or retarding the rotation of the turntable 13 thereby assisting in perfect unwinding of very long film coils.

What I claim is:

1. A film winding device comprising, in combination, a turntable for supporting a roll of film; film feeding means including a rotatable core mounted centrally with respect to said turntable, and means for maintaining a film band in engagement with said core; a driving shaft; first means for driving said core from said shaft at a rate proportional to the angular rate of said shaft; and second driving means between said table and shaft for driving the table at an angular rate proportional to the rate of the shaft higher than the angular rate of said core, if the shaft is rotated in one direction, said means being adapted to permit independent rotation of the table at a lower rate than said core if the shaft is rotated in the opposite direction.

2. A film winding device comprising, in combination, a turntable for supporting a roll of film; film feeding means including a rotatable core mounted centrally with respect to said turntable, and means for maintaining a film band in engagement with said core; a central driving shaft; means for driving said core from said shaft; and a planetary gear engaging said shaft and said table for driving said table from said shaft.

3. A film winding device comprising, in combination, a turntable for supporting a roll of film; a rotatable cylindrical core mounted centrally with respect to said turntable, said core having peripheral perforations corresponding to film perforations; means for maintaining a film band in engagement with said core; a sprocket wheel engaging said perforations; a central driving shaft; and means for driving said wheel from said shaft.

4. A film winding device comprising, in combination, a turntable for supporting a roll of film; a rotatable cylindrical core mounted centrally with respect to said turntable, said core having two spaced parallel rows of perforations, one row corresponding to standard 35 millimeter film perforations, the other corresponding to standard 16 millimeter film perforations; a sprocket wheel engaging each of said rows of perforations; means for maintaining a film band in engagement with said core; a central driving shaft; and means for driving at least one of said wheels from said shaft.

5. A film winding device comprising, in combination, a turntable for supporting a roll of film; a rotatable cylindrical core mounted centrally with respect to said turntable, said core having an outside diameter equal to a whole multiple of the perforation spacing of both standard 35 millimeter and standard 16 millimeter film and having two spaced parallel rows of perforations, one row corresponding to standard 35 millimeter film perforations, the other corresponding to standard 16 millimeter film perforations; a sprocket wheel engaging each of said rows of perforations; means for maintaining a film band in engagement with said core; a central driving shaft; first driving means for driving at least one of said wheels from said shaft; and second driving means for driving said turntable from said shaft.

6. A film winding device comprising, in combination, a turntable for supporting a roll of film; a rotatable film feeding core mounted centrally with respect to said turntable; means for maintaining a film band in engagement with said core; and reversible driving means disengageable with respect to said table for driving said table at a higher angular velocity than said core in one direction and driving said core, but not said table, in the reverse direction.

7. A film winding device comprising, in combination, a driving shaft; a cylindrical core mounted coaxially with, and for rotation relatively to, said shaft, said core having peripheral perforations corresponding to film perforations; a gear mounted on said shaft; a sprocket wheel mounted inside said core to engage said perforations, said sprocket wheel being driven by said gear; a roller cooperating with said core for maintaining a film band in engagement with the sprockets of said wheel said sprockets projecting through said perforations; and a turntable adapted to support a roll of film, said turntable being coaxially mounted with said shaft.

8. A film winding device comprising, in combination, a driving shaft; a cylindrical core mounted coaxially with, and for rotation relatively to, said shaft, said core having two rows of peripheral perforations, a first row corresponding to 35 millimeter film perforations, the second row corresponding to 16 millimeter film perforations; a gear mounted on said shaft; a first and a second sprocket wheel mounted inside said core to engage said first and second row of perforations respectively, one of said wheels being driven by said gear; a first and a second roller cooperating with said core for maintaining a film band in engagement with the sprockets of said first and second wheel, respectively, said sprockets projecting through said perforations; a turntable adapted to support a roll of film, said turntable being mounted coaxially with said shaft; and means for driving said turntable from said shaft.

9. A film winding device comprising, in combination, a turntable for supporting a roll of film; film feeding means including a rotatable core mounted centrally with respect to said turntable, and means for maintaining a film band in engagement with said core; a driving shaft; means for driving said core from said shaft at an angular rate proportional to the rate of the shaft; and a driving means between said table and said shaft, adapted positively to drive said table at an angular rate proportional to the rate of the shaft if the shaft is driven in one direction and adapted to disengage said table from said shaft if the shaft is driven in the opposite direction.

GUSTAV FRIES.